United States Patent Office 2,923,222
Patented Feb. 2, 1960

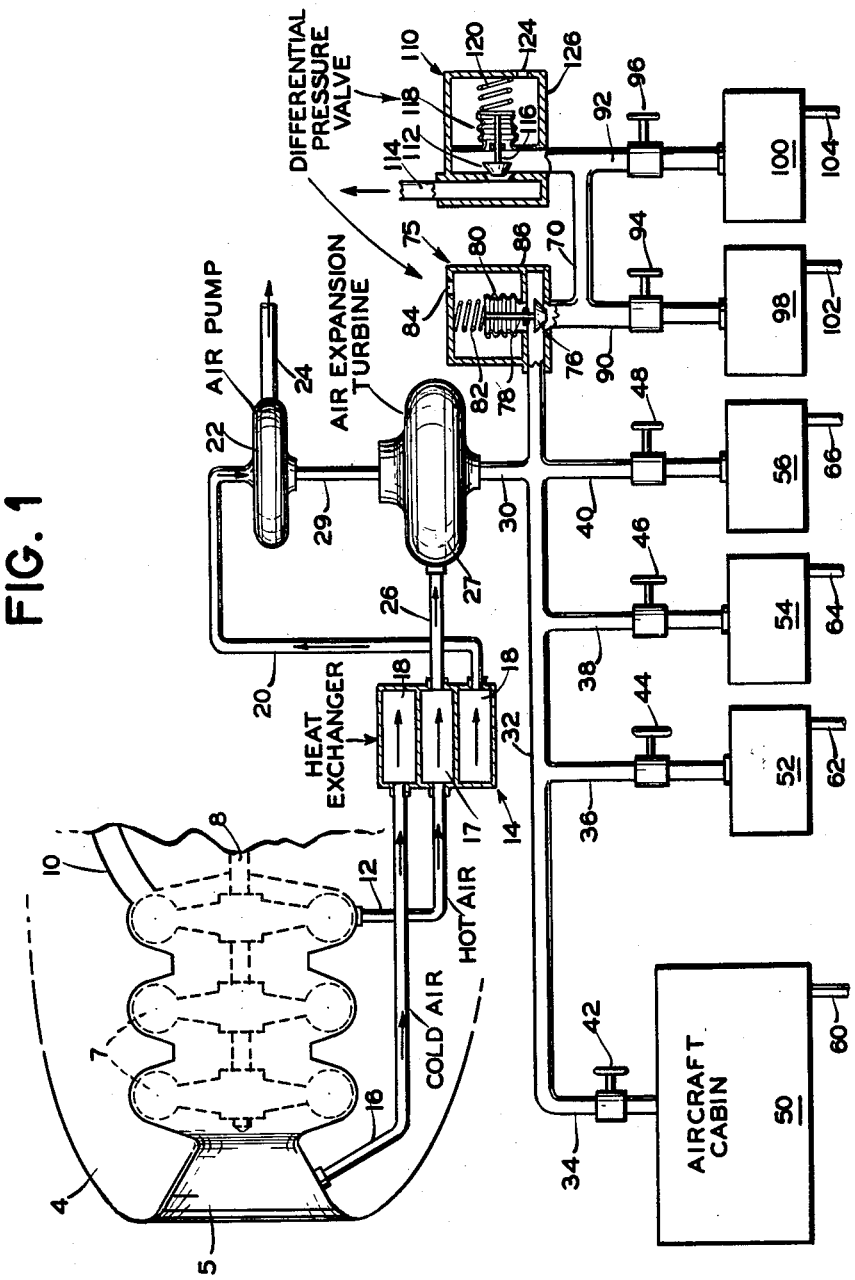

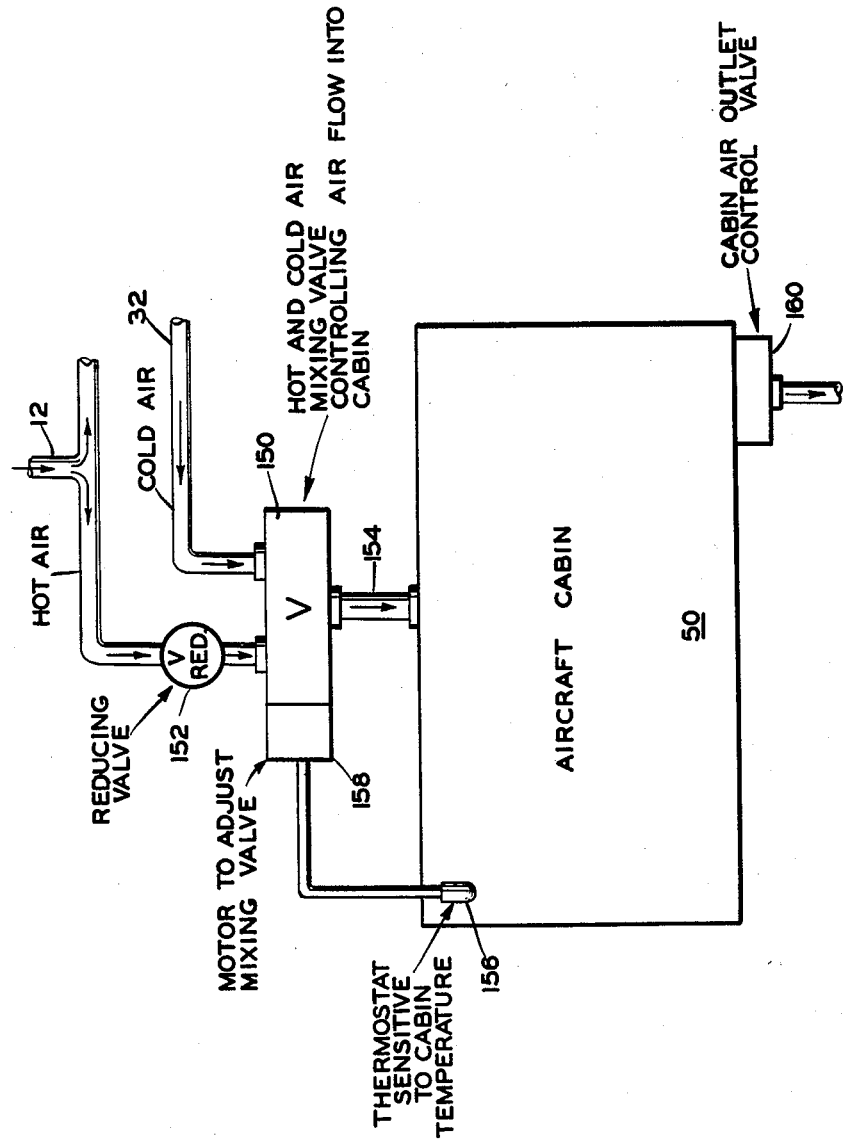

2,923,222

AIRFLOW CONTROL MEANS FOR AIRCRAFT CABINS AND COMPARTMENTS

Edward V. Manning, Morris Plains, and Joseph J. Witkiewicz, Paramus, N.J., assignors to Bendix Aviation Corporation, Teterboro, N.J., a corporation of Delaware Application July 18, 1955, Serial No. 522,530

4 Claims. (Cl. 98—1.5)

The present invention relates to novel means for controlling the flow of air to a plurality of compartments in an aircraft as supplied from a single source of air, such as may be used for the air conditioning of aircraft cabins and other aircraft equipment or accessory compartments. More particularly, the invention is directed to novel means for controlling the distribution of air by means of constant differential pressure controls arranged to provide a constant pressure source for the several compartments under conditions of varying air flow requirements.

An object of the invention is to provide in an air expansion conditioning system improved differential pressure control means to maintain a constant turbine exhaust gauge pressure.

Another object of the invention is to provide a control system to provide stable and active control of conditioned air under varying flight conditions encountered by high performance aircraft.

With an air flow control system incorporating a by-pass type control only, the cold air flow to the several aircraft compartments supplied by such a system is affected by the varying demands of the several compartments. Such varying demands for air flow will result in changes in the exhaust pressure in the expansion turbine used to supply cold air to the several compartments causing variations in the temperature of the air and affecting the stability of the control system.

In view of the foregoing, an object of the present invention is to provide a novel system to control the distribution of conditioned air flow to the several compartments supplied from the discharge of an expansion turbine by providing therein means for effecting a constant differential supply pressure of air so as to simplify the controls needed to regulate the flow of air into each of the several compartments to be serviced thereby.

Another object of the invention is to provide a novel air supply system and control for the distribution of air flow to several aircraft compartments connected to a common pressure source, together with means for regulating a constant differential pressure across inlets and outlets of the several compartments, thereby maintaining a constant rate of flow through the compartments.

Another object of the invention is to provide an air supply system and means to control the distribution of air flow to several compartments of an aircraft connected to the discharge of an expansion turbine, and including means for regulating a constant differential pressure before a given group of compartments and other means for regulating constant differential pressure before another group of given compartments so as to establish a priority of air flow between various groups of compartments.

Another object of the invention is to provide an air supply system together with means to control the distribution of air flow to several groups of compartments connected to a common pressure source of conditioned air, together with novel means for regulating a constant gauge pressure before each group of compartments so as to establish a priority in air flow between the various groups of compartments.

Another object of the invention is to provide means for effecting control distribution of air flow to several compartments in such a way as to provide a supply of air to any individual compartment which will be independent of the air flow demands of one or more of the other compartments.

Another object of the invention is to provide novel means for providing conditioned air to each of several compartments, together with means for providing a constant gauge pressure ahead of each compartment which is independent of the requirements of one or more of the individual compartments.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In the drawings:

Figure 1 is a schematic view of an air supply system embodying the invention;

Figure 2 is a schematic view illustrating a modification of an air inlet control for the aircraft cabin, shown schematically in Figure 1.

In the fragmentary drawing of Figure 1, there is indicated by the numeral 4 a turbo jet aircraft engine of conventional type having an air inlet 5 and a series of compressor stages 7 driven by a shaft 8 from a turbine, not shown, and supplying air through a conduit 10 to a combustion chamber for the engine which may be of a conventional type.

Compressed air is bled by a conduit 12 from the outlet (or an intermediate stage) of the compressor 7 and is directed through a heat exchanger shown diagrammatically herein and indicated by numeral 14 wherein the compressed air 12 is cooled by relatively cooler air supplied through a conduit 16 leading from the ram air inlet 5 to cooling passages 18 in the heat exchanger 14. The cooling air in passages 18 is in turn drawn through a conduit 20 leading to an air pump 22 from which the cooling air may be in turn discharged through an exhaust conduit 24.

The compressed air supplied to the heat exchanger 14 and through conduit 12 to passages 17 is in turn directed through a conduit 26 to an air expansion turbine 27 which is mechanically connected to a shaft 29 so as to drive the air pump 22.

An outlet conduit 30 from the air expansion turbine 27 directs the now cooled air from the conduit 26 to a conduit 32 which supplies air through conduits 34, 36, 38 and 40 through control valves 42, 44, 46 and 48 to aircraft cabin 50 and aircraft accessory compartments 52, 54 and 56, respectively. Outlet conduits 60, 62 64 and 66 lead to atmosphere or other relative low pressure area from the respective cabin 50 and accessory compartments 52, 54 and 56, respectively. A second supply conduit 70 is connected to the conduit 32 through a pressure differential regulator 75.

The differential pressure regulator 75 may be of any suitable type and, for purposes of illustration, is shown schematically as including a valve element 76 controlling the connection between the supply condit 32 and the supply conduit 70. The valve element 76, as shown schematically in the drawing, is operated through a rod 78 operably connected to a differential bellows or diaphragm 80 biased by a spring 82 in a sense to close valve 76 and which bellows 80 is subject interiorly to the pressure in the conduit 32 acting in opposition to spring 82 and exteriorly to atmospheric pressure applied thereto through a port 84 in a casing 86. The differential pressure regulator 75 is thus arranged so as to position the valve element 76 so as to maintain the pressure in the supply conduit 32 at a predetermined differential in excess of the prevailing atmospheric pressure.

The supply conduit 70, in turn, is connected through conduits 90 and 92 through control valves 94 and 96 to aircraft accessory compartments 98 and 100 having outlet conduits leading to atmosphere or other relatively low pressure area, said outlet conduits being indicated by the numerals 102 and 104, respectively.

Controlling the second supply conduit 70 is a second differential pressure regulator, indicated generally by the numeral 110. The differential pressure regulator 110, as shown schematically, has a valve element 112 controlling connection of the supply conduit 70 to an exhaust conduit 114 leading to atmosphere or other relatively low pressure area. The valve element 112 is adjustably positioned by a rod 116 operably connected to a bellows or diaphragm 118 biased by a spring 120 in a valve closing sense. The bellows 118 is subject interiorly to the pressure in a supply conduit 70 while the bellows is exteriorly subject to atmospheric pressure supplied through a port 124 in a casing 126 of the valve mechanism.

The differential pressure responsive bellows 118 controls the position of the valve element 112 so as to maintain the pressure in the supply conduit 70 at a predetermined differential pressure above that of the prevailing atmospheric pressure and the pressure setting of the regulator 110 is such as to maintain a predetermined differential pressure in conduit 70 somewhat below that maintained in the supply conduit 32 by operation of the differential pressure regulator 75, hereinbefore explained.

*Operation*

Referring to the drawing of Figure 1, it will be seen that the discharge air from the turbine 27 passes through conduit 30 into a supply conduit 32 and then to the aircraft cabin 50 and the several accessory compartments 52, 54 and 56 through the respective control valves therefor. While the drawing shows schematically only one aircraft cabin 50 and three accessory compartments 52, 54 and 56 in the circuit upstream of the differential pressure regulator 75, it will be understood that this is purely illustrative and is not intended to be restrictive, since any number of cabins and/or accessory compartments may be conditioned with this type of system.

The conditioned air from the pressure supply conduit 32 also flows into the second supply conduit 70 through the pressure differential regulator 75 which maintains a constant pressure differential between the pressure in conduit 32 and the prevailing atmospheric pressure surrounding the system. Thus, a constant bleed system and source of conditioned air is made available to the cabin 50 and accessory compartments 52, 54 and 56.

In this way the control of air flow and the temperature of the air to the several compartments is simplified, since the opening and closing of the respective control valves 42, 44, 46 and 48 will not in turn affect the back pressure acting on the air expansion turbine 27 and thus cause a variance in the temperature and pressure supplied thereby into the several other compartments, but instead a change in adjustment of any one of the control valves 42, 44, 46 and 48 will be compensated for by the action of the differential pressure regulator 75 which serves to regulate the air supply so as to maintain the pressure in the supply conduit 32 at the predetermined constant pressure differential.

Similarly, the pressure in the second supply conduit 70 will be unaffected by adjustment of the respective valves 94 and 96 controlling compartments 98 and 100, respectively, since a change therein will be compensated for by the action of the differential pressure regulator 110 which acts to maintain a second constant differential pressure between the pressure in supply conduit 70 and the prevailing atmospheric pressure surrounding the system. Thus, a constant gauge pressure source of conditioned air is made available to accessory compartments 98 and 100, which again results in simplified control of air flow and air temperature.

While there is shown schematically in Figure 1 the several valves 42, 44, 46, 48, 94 and 96 controlling the respective compartments, it should be understood that use of such valves at any or all of these locations may depend upon the specific air flow requirements for particular applications. In many cases the use of ordinary restrictions, ducts or equipment pressure losses will satisfy the flow requirements when used in the system for controlling air flow distribution described herein.

Through use of differential pressure regulators 75 and 110, there may be predetermined a priority of distribution of air flow between the various accessory compartments and the cabin. Thus, as the quantity of compressed air from the turbine discharge 30 decreases, the pressure regulator 110 will gradually close valve 112, maintaining a predetermined constant gauge pressure in the supply conduit 70 and decreasing the amount of air being bled off until the differential pressure valve 112 is completely closed. Then the differential pressure regulator 75 will start to close valve 76 so as to reduce the rate of air flow to the supply conduit 70 from the conduit 32 until the predetermined pressure for conduit 32 is obtained or under extreme conditions the valve 76 is completely closed. It will be seen then that the distribution of air flow to the compartments being supplied through conduit 32 has priority over the compartments being supplied through the conduit 70.

As a point of further clarification, it will be seen that the differential pressure regulator 110 may be considered as basically another differential pressure regulator similar to regulator 75, since both regulators serve to maintain a preset constant gauge pressure in the respective conduits which they are controlling. It will be clear then that additional groups of compartments may be supplied on an expanded priority basis by means of additional differential pressure regulators.

*Modified cabin pressure control valve system*

Referring now to the drawing of Figure 2, there is shown therein schematically a control valve system for the aircraft cabin 50 in which there is supplied through a hot and cold mixing valve 150 of conventional type cold air from supply conduit 32 and hot air supplied from the hot air bleed conduit 12 which is passed through a reducing valve 152 of conventionanl type to the mixing valve 150 and therefrom through a common supply conduit 154 to the aircraft cabin. There may be further provided a temperature sensitive element 156 mounted at a suitable point in the cabin and controlling an actuator or motor 158 which may be of conventional type, to adjust the mixing valve 150 so as to provide a proper mixture of the cold air from conduit 32 and hot air from conduit 12 to maintain the temperature in the aircraft cabin 50 at a predetermined value.

Air from the cabin 50 may be exhausted to atmosphere through a suitable cabin pressure regulating valve 160 of a type to maintain the pressure in the aircraft cabin at a pressure in accordance with a predetermined schedule, and which valve mechanism may be of a type such as described and claimed in U.S. Patent No. 2,441,088 and U.S. Patent No. 2,447,918 granted Walter D. Teague, Jr., and both of which patents have been assigned to the Bendix Aviation Corporation, the assignee of the present application.

Although only two embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a system to control distribution of conditioned air flow from a common source to several compartments, said compartments having means for exhausting the air supplied thereto to a relatively low pressure area; the combination comprising means for connecting said source to said compartments, said connecting means including first valve means arranged to regulate the air supplied to at least one of said compartments, said first valve means being subject to the pressure of said one compartment and to atmospheric pressure and constructed to regulate air to a constant differential pressure value in excess of the prevailing atmospheric pressure by a first predetermined value, said first valve means having an outlet for supplying air therethrough to other of said compartments, and said connecting means including second valve means having an outlet to a low pressure area and arranged to regulate the air supplied the other of said compartments, said second valve means being subject to the pressure of said other compartment and to atmospheric pressure and constructed to regulate air to a constant differential pressure value in excess of the prevailing atmospheric pressure by a second predetermined value and a value less than said first predetermined value, whereby there is provided priority of air flow to the first of said compartments mentioned.

2. In a system to control distribution of conditioned air flow to several compartments supplied from the discharge of an air driven expansion turbine and said compartments having means for exhausting to a relatively low pressure area; the combination comprising a first air conduit arranged for conducting air from the discharge of said turbine to at least one of said compartments, a branch from said first air conduit having first valve means, a second air conduit, said branch connected to said second air conduit through said first valve means, said second air conduit conducting air flow from said first valve to another of said compartments, a first differential fluid pressure responsive means arranged for operating said first valve means so as to regulate the air pressure in said first air conduit to a value in excess of the prevailing atmospheric pressure by a first predetermined value, a second valve means opening said second air conduit to a relatively low pressure area, and a second differential fluid pressure responsive means for operating said second valve means so as to regulate the air pressure in said second air conduit to a value in excess of the prevailing atmospheric pressure by a second predetermined value which is less than the pressure in said first conduit.

3. In an aircraft a system to control distribution of conditioned air flow to several compartments of said aircraft, said compartments having means for exhausting to atmosphere, and said aircraft including an air driven turbine having an air discharge, the combination comprising a first air conduit arranged for conducting air flow from the discharge of said turbine to air inlet conduits of a first group of said compartments, a second air conduit, first valve means arranged for opening said first air conduit to said second air conduit, said second air conduit arranged for conducting air flow from said first conduit to air inlet conduits of another group of said compartments, a first differential fluid pressure responsive means sensitive to the air pressure in said first conduit and prevailing atmospheric pressure, means operatively connecting said first differential fluid pressure responsive means to said first valve means so as to regulate the air pressure in said first air conduit to a value in excess of the prevailing atmospheric pressure by a first predetermined value, a second valve means opening said second air conduit to atmosphere, and a second differential fluid pressure responsive means for operating said second valve means so as to vary said opening to atmosphere and thereby regulate the air pressure in said second air conduit to a value in excess of the prevailing atmospheric pressure by a second predetermined value and a value less than the air pressure in said first conduit so that the first group of compartments of said aircraft have priority of air flow as to the second group of compartments.

4. In a system to control distribution of conditioned air flow to several compartments each having a control valve in an air inlet conduit connected to the discharge conduit of an air driven turbine and each having an air outlet opening therefrom; the combination comprising first means for providing for air flow from the turbine discharge conduit through a common conduit to the air inlet conduits of a first group of said compartments, said first means being subject to the pressure of said first group of said compartments and arranged so as to maintain the air supplied said first group of compartments at a constant differential pressure in excess of atmospheric pressure by a first predetermined value, said first means having an outlet for air, other means connected to said outlet for providing for air flow to the air inlet conduits of another group of said compartments, said other means being subject to the pressure of said another group of said compartments and arranged so as to maintain the air supplied said another group of said compartments at a constant differential pressure in excess of atmospheric pressure by a second predetermined value which is somewhat less than said first predetermined value whereby a priority of supply to said first group of compartments results and whereby pressure changes due to adjustment of said control valves will be compensated by said first means and other means.

References Cited in the file of this patent

UNITED STATES PATENTS

| | | |
|---|---|---|
| 2,366,146 | Martin-Hurst | Dec. 26, 1944 |
| 2,425,000 | Paget | Aug. 5, 1947 |
| 2,463,487 | Widgery et al. | Mar. 1, 1949 |
| 2,772,621 | Arnoldi | Dec. 4, 1956 |
| 2,814,241 | Silver | Nov. 26, 1957 |
| 2,851,254 | Messinger et al. | Sept. 9, 1958 |